Figure 1:
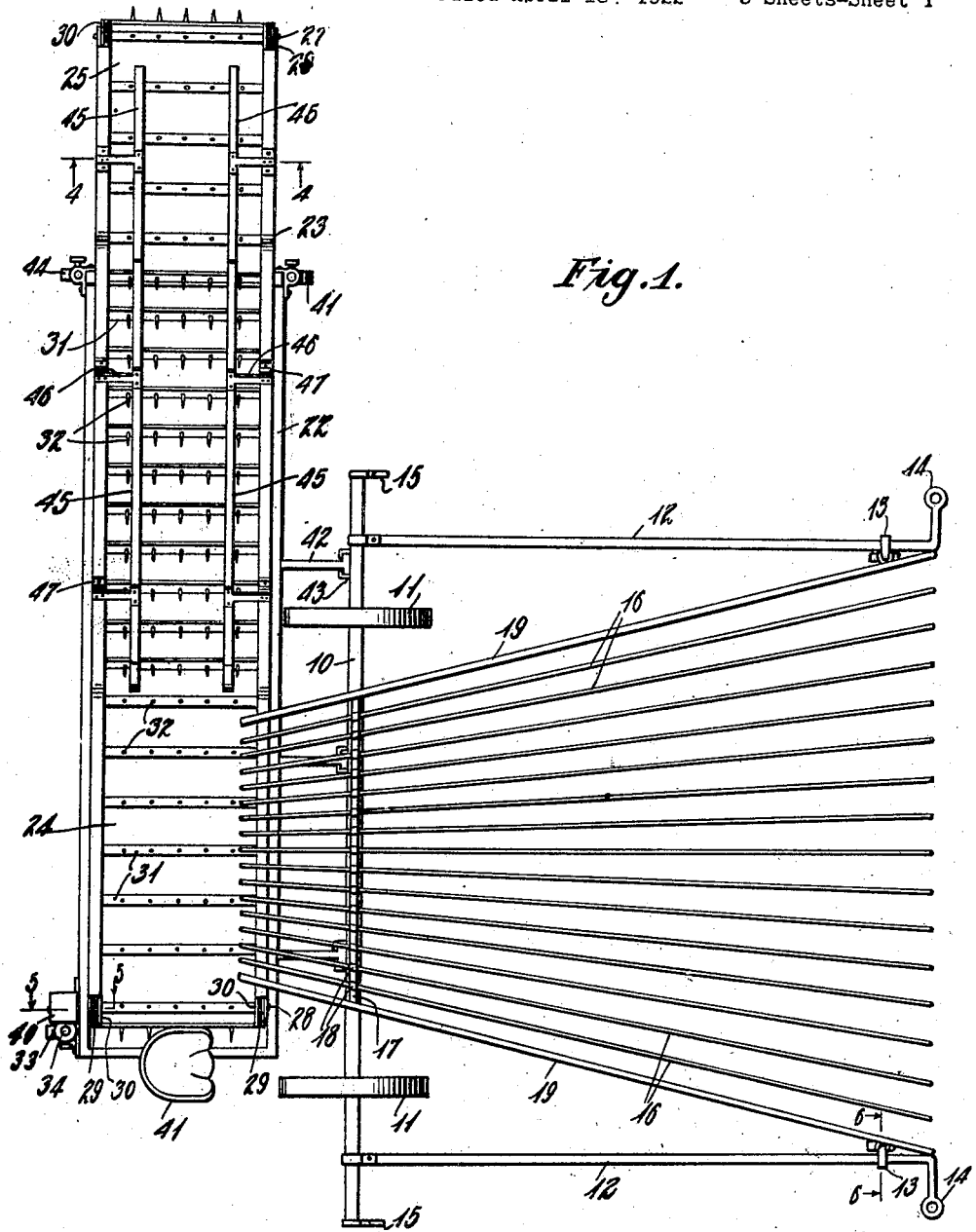

April 8, 1924.
H. KUHLKEN, JR
HAY LOADER
Filed April 18, 1922    3 Sheets-Sheet 1

1,490,075

Inventor
Henry Kuhlken Jr.

By    Attorney

April 8, 1924.
H. KUHLKEN, JR
1,490,075
HAY LOADER
Filed April 18, 1922        3 Sheets-Sheet 2
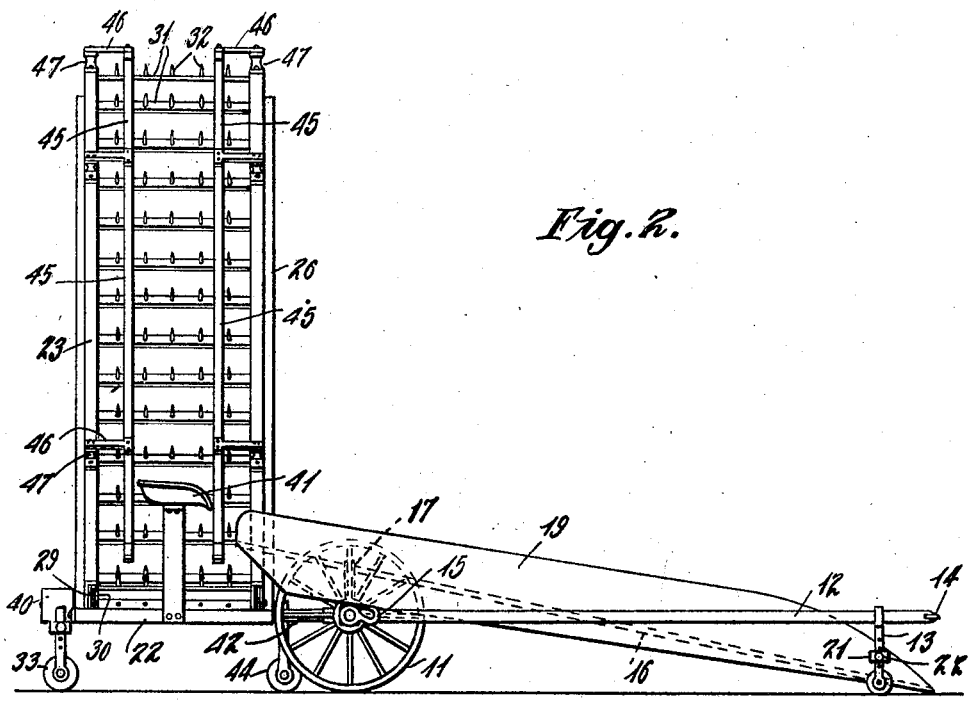
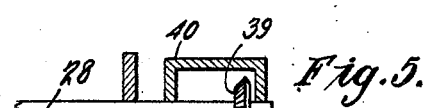
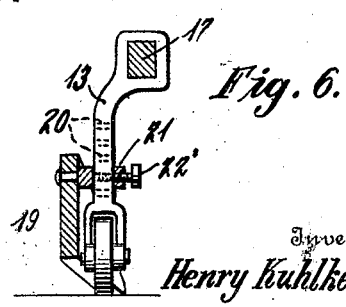
Inventor
Henry Kuhlken Jr.
By
Attorney

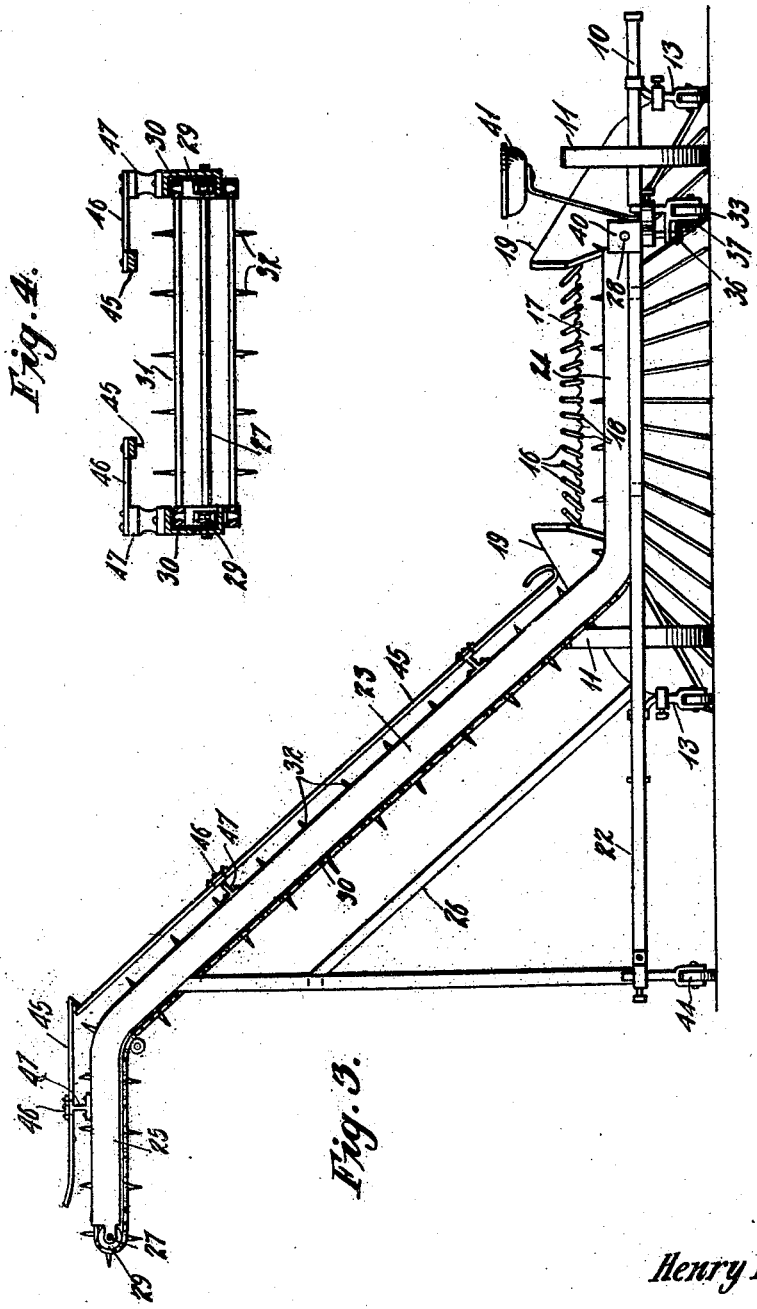

Patented Apr. 8, 1924.

1,490,075

UNITED STATES PATENT OFFICE.

HENRY KUHLKEN, JR., OF HOLSTEIN, IOWA.

HAY LOADER.

Application filed April 18, 1922. Serial No. 554,400.

*To all whom it may concern:*

Be it known that I, HENRY KUHLKEN, Jr., a citizen of the United States, residing at Holstein, in the county of Ida and State of Iowa, have invented certain new and useful Improvements in Hay Loaders, of which the following is a specification.

This invention has reference to certain new and useful improvements in hay loading devices.

An object of the invention is to provide a portable machine including means for gathering the hay or other material and conveying means for elevating the gathered material into a wagon or other vehicle.

Various other objects and advantages of the invention will become apparent from the following description.

In the drawings:

Figure 1 is a top plan view of the proposed hay loader,

Figure 2 a view in side elevation thereof,

Figure 3 a rear end elevation thereof,

Figure 4 is a detailed sectional view of the elevator taken along line 4—4 of Figure 1, Figure 5 is a sectional detailed view of the elevator drive, taken along line 5—5 of Figure 1, and Figure 6 a detailed view of the form adjustment taken on line 6—6 of Figure 1.

Describing the invention in detail, 10 designates the draw bar of the fork-carrying frame, which bar also serves as an axle for the ground wheels 11. Connected to the draw bar at opposite ends are a pair of spaced parallel tongues 12 which have their outer ends supported by trucks 13, as shown in Figure 6. The fork-carrier is drawn by two horses, one on the outside of each tongue 12 and pulling in a direction parallel to the tongue, the same having a neck yoke 14 at its outer end in line with a hitch fastener at 15 on the draw bar.

The fork is constructed of a plurality of spaced outwardly diverging spring steel rods or tines 16 which have their rear ends projected across a bridge plate 17 to which the tines are suitably fastened as shown at 18 in Figure 1. The bridge plate is hinged, pivoted or otherwise fastened to the draw bar so as to be capable of swinging movement in a vertical plane and carries the sideboards 19, between which the tines of the fork are confined. Each sideboard has its outer end supported by a truck 13 so that it may be raised or lowered, thereby tilting the bridge plate on the draw bar for raising or lowering the front end of the fork with respect to the ground. This adjustment may be effected by the structure shown in Figure 6 which includes the provision of vertically spaced holes or notches 20 in the standards of each truck and providing sideboards with a bracket 21 having a set screw 22' for engaging any selected hole or notch.

A separate rectangular frame 22 carries the conveyor 23 which has its lower or receiving end 24 positioned at one end of the frame and its discharge end 25 elevated above the opposite end of the frame; the intermediate portion of the conveyor being inclined to the frame and supported by structure 26. Journaled crosswise of the conveyor, at opposite ends, are shafts 27 and 28 which carries sprocket 29. Endless chains 30 pass around corresponding sprockets of the shafts and are connected by cross bars 31 which are spiked, as shown at 32. These spiked bars carry the hay up along the top side of the elevator and return on the lower side. The elevator is operated from shaft 28 which is geared to the ground wheel 33 as illustrated in Figure 5. Wheel 33 is supported in a bracket 34 in which is also journaled a vertically disposed stub shaft 35. At one end of the shaft 35 is a gear 36 which meshes with the gear 37 carried by wheel 33 and at the other end of the shaft is a gear 38 which meshes with a gear 39 on shaft 28. A suitable housing 40 encloses gears 38 and 39.

Frame 22 is adapted, when in position, to be disposed longitudinally of draw bar 10 with the receiving end 24 underlying the projected rear ends of the fork tines 16 to receive the hay taken up by the fork as the machine is moved forward. The receiving end of frame 22 supports the driver's seat 41 and is connected to the fork frame by a series of forwardly projecting arms 42 having T-heads engageable in the T-slot of sockets 43 which are fastened to the draw bar. Suitable ground wheels 44 support opposite ends of frame 22 and are adjustable for raising and lowering same as required. Overlying the upper and the inclined portions of the elevator are sets of wooden runners 45 which serve to prevent the scattering or waste of hay while being elevated. These runners are yieldably supported by spring arms 46 which are fastened in brackets 47 on the sides of the conveyor, as illustrated in Figure 4.

In operation the fork picks up the hay by being moved forward and discharges it into the receiving end of the conveyor from which it is carried upwardly by the spike bars of the chain and discharged from the upper end of the elevator into a waiting wagon or other vehicle.

From the foregoing it is thought that the advantages and novel features of the invention can be readily understood and that further detailed description thereof is not required.

What is claimed is:

1. A hay loading device comprising a draw bar and having hitch connection at opposite ends, tongues connected to the said draw bar in relatively spaced parallel relation, said tongues having their outer ends connected respectively with a neck yoke and in line with the hitch connection of the said draw bar, a gathering fork supported by said draw bar and inwardly of the said tongues, elevator means disposed longitudinally of the said draw bar for receiving the discharge from the said fork, and a separable connection between the said draw bar and the said elevator.

2. A device of the character described, comprising a draw bar, tongues connected to said draw bar in relatively spaced relation, a gathering fork having connection at one end to said draw bar, and vertically adjustable trucks supporting the outer ends of said tongues and said fork.

3. A hay loading device, comprising a draw bar, tongues connected to said draw bar in relatively spaced relation, a gathering fork supported at its inner end by said draw bar, and vertically adjustable trucks supporting the outer ends of said tongues and said fork; in combination with elevator means to receive discharge from said fork and a separable connection between said elevator means and said draw bar.

In testimony whereof I affix my signature.

HENRY KUHLKEN, Jr.